United States Patent [19]

Fujimoto et al.

[11] 4,124,748

[45] Nov. 7, 1978

[54] CROSS-LINKED SAPONIFIED ABSORBENT POLYMER

[75] Inventors: Masanori Fujimoto, Ibaraki; Kozo Tsuji; Tsuneyuki Nagase, both of Takatsuki, all of Japan

[73] Assignee: Sumitomo Chemical Company, Limited, Osaka, Japan

[21] Appl. No.: 743,332

[22] Filed: Nov. 19, 1976

[30] Foreign Application Priority Data

Nov. 27, 1975 [JP] Japan .............................. 50-141931

[51] Int. Cl.² ............................ C08F 8/12; C08F 8/44
[52] U.S. Cl. ....................................... 526/8; 128/284; 260/29.6 B; 260/33.4 R; 526/10
[58] Field of Search ....................................... 526/10, 8

[56] References Cited

U.S. PATENT DOCUMENTS

| 2,458,639 | 1/1949 | Quarles ................................. 260/43 |
| 2,569,932 | 10/1951 | Izard ................................... 260/67 |
| 3,082,194 | 3/1963 | Imperiale et al. ................... 260/91.3 |
| 3,203,918 | 8/1965 | Goldberg et al. ................... 260/29.6 |
| 3,640,734 | 2/1972 | Oppenheimer et al. ............... 99/176 |

*Primary Examiner*—Stanford M. Levin
*Attorney, Agent, or Firm*—Cushman, Darby & Cushman

[57] ABSTRACT

A highly absorbent polymer is obtained by saponifying a crosslinked copolymer of a vinyl ester and an ethylenically unsaturated carboxylic acid or the derivative thereof. The absorbent polymer is suitable as a material, for example, for separation and purification of substances and a seed culturing media for plants.

16 Claims, No Drawings

CROSS-LINKED SAPONIFIED ABSORBENT POLYMER

The present invention relates to a method for the preparation of a polymer having an ability to absorb a large amount of water.

As application of hydrophilic polymers to the medical industry, food industry or agricultural fields has recently advanced, water-insoluble and hydrophilic or water-absorbing polymers have begun to be used as materials for separation and purification such as various membranes and carriers for liquid chromatography, as enzyme supporting materials, as culturing materials for microorganisms or plants, and medical materials such as contact lens and suture-protective materials; and as materials requiring water absorbability and water retentivity. Among those uses, particularly in the application fields which make use of water absorbability and water retentivity, it is desired for the polymers to absorb as large an amount of water as possible in a short period of time when they are brought into contact with water.

Hitherto, there have been proposed several materials which are made of natural or synthetic polymer substances, for example crosslinked products of polyethylene oxide, polyacrylic acid, polyacrylamide, polyvinyl pyrrolidone or sulfonated polystyrene; cellulose derivatives; and saponified products of starch-acrylonitrile graft copolymers. However, with the exception of the saponified products of starch-acrylonitrile graft copolymers, these materials are low in the water-absorbing ability and unsatisfactory as a water-absorbent material. The saponified products of starch-acrylonitrile graft copolymers, however, have a number of drawbacks in that, for example, methods for preparing the same, even after various improvements have been made, are relatively troublesome and, when they are used in a hydrated state for a long time, the starch component rots and the gel structure is broken. The term "hydrated" referred to herein means "contain water" hereinafter.

The well-known methods for the preparation of such polymers are, for example, crosslinking of water-soluble polymers with a crosslinking agent or modifying the water-soluble polymers to water-insoluble ones by partial substitution of the hydrophilic groups with hydrophobic ones. In the crosslinking procedure above, degree of crosslinking and water-absorbing ability are opposed to each other. As the crosslinking degree is increased with an increase of an amount of a crosslinking agent, the water-absorbing ability reduces.

Copolymers comprising a vinyl ester and an ethylenically unsaturated carboxylic acid or derivative thereof, and methods for the preparation thereof are wellknown. It is also well known that water-soluble copolymers can be obtained by saponification of said copolymers. Furthermore, conventional saponified copolymers are only used for adhesive, paper-converting agents, paints, coating materials and modifiers for polyvinyl alcohol.

The present inventors made extensive studies to exploit highly absorbent polymers and proposed that a polymer which is obtained by saponifying a copolymer of a vinyl ester and an ethylenically unsaturated carboxylic acid or the derivative thereof, followed by insolubilization in water, has excellent water-absorbing ability (U.S. Patent Application No. 707,768, filed on July 22, 1976). The present inventors have succeeded in providing an improved method for preparation of absorbent polymers. According to the present invention, the water-insoluble polymeric material is obtained by saponifying a cross-linked copolymer of a vinyl ester and an ethylenically unsaturated carboxylic acid or the derivative thereof.

An object of the present invention is to provide a method for the preparation of water-insoluble, hydrophilic polymers.

Another object of the present invention is to provide water-insoluble, hydrophilic polymers having a water absorption ability.

Other and further objects, and advantages of the present invention will become apparent from the following description.

According to the present invention, there is provided a polymer which can absorb as large an amount of water as more than 10 times their own weight and has stable gel formation ability in a hydrated state for a long time.

The starting materials used in the present invention are crosslinked copolymers of a vinyl ester and an ethylenically unsaturated carboxylic acid or derivative thereof. The cross-linked copolymers can be obtained by polymerizing the vinyl ester and the ethylenically unsaturated carboxylic acid or derivative thereof in the presence of a crosslinking agent (one step process). Alternatively, the vinyl ester and the ethylenically unsaturated carboxylic acid or derivative thereof are copolymerized to produce a copolymer thereof (hereinafter referred as "copolymer A") and thereafter the copolymer A is subjected to crosslinking reaction (two steps process).

According to the one step process as mentioned above, crosslinking reaction is effected simultaneously with copolymerization by addition of a crosslinking agent having two or more of polymerizable unsaturated bonds in the molecule. Said crosslinking reaction can be practiced either in the presence or in absence of a solvent. Usually, a radical initiator such as peroxides (e.g. di-tert-butyl peroxide, benzoyl peroxide), persulfates (e.g. ammonium persulfate) or azo compounds (e.g. azobisisobutyronitrile) may be added as a catalyst. A radical initiator is generally used in an amount of from 0.001 to 5 mole % based on the total amount of the monomers.

The crosslinking agents to be used in the present invention may include, for example, polyallyl compounds such as diallyl phthalate, diallyl maleate, diallyl terephthalate, triallyl cyanurate or triallyl phosphate; polyvinyl compounds such as divinyl benzene, N,N'-methylene-bis-acrylamide, ethyleneglycol diacrylate, ethyleneglycol dimethacrylate or glycerine trimethacrylate; allyl acrylate, allyl methacrylate, etc. Among them, polyvinyl compounds are particularly preferred.

The amount of the crosslinking agent is varied depending on the kind thereof, but generally falls within the range from 0.005 to 20 mole % based on the total amount of the monomers (except the crosslinking agent) to be copolymerized, preferably not more than 10 mole %. When the crosslinking agent is used in an amount less than 0.005 mole %, the absorbent polymer obtained is small in gel strength; while it is small in water-absorbing ability due to the higher degree of crosslinking of said copolymer obtained when the amount is more than 20 mole %.

The two steps process is practiced by first preparing the copolymer A by any well known method, for example, by radical copolymerization using a radical initiator as mentioned above, followed by crosslinking of the copolymer A. The crosslinking of the copolymer A is effected preferably by use of the crosslinking agent as mentioned above in an amount of from 0.005 to 20 mole %, preferably not more than 10 mole %, based on the total amount of monomer units in the copolymer A. Alternatively, the crosslinking of the copolymer A is effected by the method of irradiation with radio-active rays or by the method of adding a radical initiator in an amount ranging from 0.001 to 5 mole % based on the total monomer units in the copolymer A. In either method, the crosslinking agent as mentioned above may also be added in an amount within the range as specified above.

As may be understood by those skilled in the art, the absorbent polymer having the desired water-absorption ability may be obtained by properly selecting the degree of crosslinking of said copolymer which influences on the water-absorption ability of the absorbent polymer of the present invention.

The amount of the ethylenically unsaturated carboxylic acid or derivative thereof in the crosslinked copolymers largely influences the gel-strength and water-absorbing ability of the present absorbent polymers. The amount of the ethylenically unsaturated carboxylic acid or derivative thereof in said crosslinked copolymers should be within the range of 5 to 95 mole %, preferably 20 to 80 mole %, most preferably 30 to 70 mole %, the balance being vinyl esters as hereinbelow described. When an amount of the ethylenically unsaturated carboxylic acid or derivative thereof is too low, the gels obtained become very low in the water-absorbing ability. On the other hand, when the amount is too high, the gel strength in a highly hydrated state tends to reduce to an extreme degree.

The vinyl esters used for the preparation of said crosslinked copolymers include preferably vinyl esters of saturated carboxylic acids, for example, vinyl acetate, vinyl propionate and vinyl stearate. Among them, vinyl acetate is more preferred. The ethylenically unsaturated carboxylic acids or derivatives thereof include acrylic acid, methacrylic acid, crotonic acid, itaconic acid, maleic acid, fumaric acid, maleic anhydride, itaconic anhydride, esters thereof, acrylamide, methacrylamide and the like. Preferred carboxylic compounds are acrylic acid, methacrylic acid, methyl-, ethyl-, n-propyl-, isopropyl-, n-butyl- and tert-butyl-esters thereof, acrylamide and methacrylamide. At least one of the carboxylic acid compound moiety is enough for the copolymers.

Said crosslinked copolymers may be saponified by any well-known saponification method. Saponification of said crosslinked copolymers is carried out in the presence of a solvent, preferably in a swelled state. As a preferable method, there is a method using a suitable alkali substance in an alcoholic solvent. However, water or water-alcohol mixtures may also be used as a solvent. The alkali substances include, for example, alkali metal hydroxides or alcoholates, for example, sodium hydroxide, potassium hydroxide, sodium methylate, sodium ethylate and potassium methylate. When the saponification is carried out using water, preferred alkali substances are alkali metal hydroxides.

It is necessary for the saponified copolymers to have at least one vinyl alcohol component and one component of ethylenically unsaturated carboxylic acid and/or alkali salt thereof in the molecules thereof. In order to obtain water-insoluble, highly absorbent polymers, the saponification degree is 50 mole % or more, preferably at least 90 mole % of the vinyl ester component in said copolymers and 30 mole % or more, preferably 70 mole % of the ethylenically unsaturated carboxylic ester component, when the carboxylic acid moiety is in the form of ester. Further, a range of saponification degree of acrylamide, methacrylamide or the like is similar to that of esters above described.

The term "saponification" referred to herein includes not only saponification of esters but also hydrolysis reaction which converts amides and the like into carboxylic acid and/or alkali salt thereof.

The water-absorbing ability of the polymers according to the present invention is largely influenced not only by the components moiety, compositions, crosslinking density or saponification degrees of the starting copolymers, but also by the neutralization degree of the ethylenically unsaturated carboxylic acid moiety. That is, the ability becomes the highest when the ethylenically unsaturated carboxylic acid moiety is completely neutralized with an alkali. The ability is lower, as the neutralization degree reduces. This means that the water-insoluble, absorbent polymer having various water-absorbing abilities can be obtained by varying the neutralization degree of the ethylenically unsaturated carboxylic acid component. Consequently, as for the saponified copolymers used in the present invention, the neutralization degree of the ethylenically unsaturated carboxylic acid moiety is not particularly critical. In order to raise the degree of water absorbability, however, it is desirable that all or substantially all of the acid component in the copolymer has been converted into an alkali salt. In this case, the alkali salts include alkali metal salts such as sodium salt and potassium salt, ammonium salts and organic amine salts.

The thus obtained absorbent polymers of the present invention generally have an ability to absorb water of more than ten times as much as their own weight, as described above. When water to be absorbed contains a substance, the ability varies with the kind and amount of the substance. For example, referring to absorption of water having different pH values, the ability of the absorbent polymer reaches the maximum for water having the pH of 6 to 9 and the polymer can absorb water of more than 100 times as much water as its own weight. The ability is reduced as the pH range becomes far away out of this range and the reduction becomes particularly remarkable when the pH value is less than 5. However, the ability can recover its full function when the absorbent polymer is transferred from the acidic liquor to an alkali liquor. Namely, the absorbent polymer shows a water absorption/water release reversible change depending upon the pH value of water.

As described above, the absorbent polymers of the present invention are used as a particularly suitable water absorbent materials when water to be absorbed has a pH range of 5 to 12.

The absorbent polymer materials of the present invention have the following advantages.

Firstly, the absorbent polymers are non-toxic. Therefore, they are expected to be usable without problems in the application fields within contact between the materials and human body is not avoidable, for example medical supplies such as disposable diapers, tampons, sanitary cotton, bandages and napkins. Secondary, there is no fear of the materials rotting, even when they are used in a hydrated state for a long time. Consequently, they are preferably used for industrial uses such as a water-absorber for water-containing oils, other dehydrating agents and drying agents, and for a water-retaining agent for plants and soils and other uses requiring water absorbency or water retentivity. Thirdly, the absorbent polymer materials are prepared very easily in an industrial scale and further they can be molded into optional shapes depending upon the intended use.

The polymer of the present invention may be used in combination with coloring agents, perfumes, other additives, or organic or inorganic fillers, so far as the property of the gel is not adversely affected. Furthermore, the polymer may be used together with paper, fiber, cloth and other different materials.

The present invention will be illustrated in more detail with reference to the following examples, which are not intended to limit the present invention thereto.

The water absorbency or absorbency in the examples is defined as follows:

$$\text{Water absorbency (absorbency)} = \frac{\text{weight of gel after saturation absorption of water or other liquids}}{\text{weight of dry gel}}$$

EXAMPLE 1

One mole of vinyl acetate and one mole of methyl acrylate were reacted with 0.01 mole of divinyl benzene as a crosslinking agent at 80° C. for 4 hours in benzene in the presence of benzoyl peroxide. Then, the reaction product was washed with methanol, pulverized by mill, filtered and then dried to obtain powdery crosslinked copolymer. The thus obtained copolymer had a methyl acrylate content of 43 mole %. The copolymer was insoluble in solvent such as methanol, acetone. Next, 10 g of the copolymer powder was dispersed in 300 ml. of methanol and then saponified at 60° C. for 20 hours with addition of 30 ml. of a 40 W/V % of aqueous sodium hydroxide solution. The saponification degree of the copolymer was about 95 mole % from the amount of alkali consumed. The saponified product was thoroughly washed in methanol to remove free sodium hydroxide and then dried under reduced pressure at 60° C. for 20 hours.

The powdery saponified copolymer obtained had an ability to absorb 90 times as much as its own weight of water and exhibited no change in the gel form even when dipped in excess water and allowed to stand for 2 months.

Table 1 shows the changes in water absorbency depending upon pH of water, which are reversible depending on the pH value of water.

Table 1

| pH of water | water absorbency (g/g) |
|---|---|
| 12 | 85 |
| 7 | 90 |
| 5 | 60 |
| 3 | <10 |

EXAMPLE 2

One mole of vinyl acetate-acrylic acid copolymer with acrylic acid content of 25 mole % was dissolved in 500 ml. of methanol and 0.01 mole of ethyleneglycol diacrylate as crosslinking agent and 0.02 mole of azobisisobutyronitrile as catalyst were added thereto. The reaction was conducted at 60° C. for 3 hours. After the reaction, the product was coagulated in a large amount of water, followed by pulverizing by a mixer, to obtain powdery crosslinked copolymer. The copolymer was swellable but insoluble in methanol, acetone, etc.

Then, 10 g of the thus prepared powdery copolymer was swelled in 300 ml. of methanol and saponification was carried out at 60° C. for 3 hours with addition of 20 ml. of 40 W/V % aqueous NaOH solution. The saponification degree was determined from the amount of alkali consumed to be about 90 mole %.

The saponified copolymer was washed thoroughly with methanol to remove free NaOH, followed by drying under reduced pressure at 60° C. for 20 hours.

The saponified copolymer obtained had an ability to absorb 50 times as much as its own weight of water and exhibited no change in the gel form even when dipped in excess water and allowed to stand for 2 months.

EXAMPLE 3

A mixture of 0.7 mole of vinyl acetate, 0.5 mole of methyl acrylate, 0.03 mole of ethyleneglycol diacrylate as crosslinking agent and 0.02 mole of benzoyl peroxide as polymerization initiator was subjected to suspension polymerization in 300 ml. of water containing 3 g of partially saponified polyvinyl alcohol as suspension stabilizer and 10 g of NaCl at 65° C. for 6 hours. The resulting copolymer had a methyl acrylate content of about 47 mole % and the acetone-insoluble components amounted to 63 wt.%.

Then, 8.6 g of the aforesaid copolymer was dispersed in 200 ml. of methanol and saponification was carried out at 60° C. for 5 hours with addition of 30 ml. of 40 W/V % aqueous NaOH solution. The saponification degree was found to be about 95 mole %. The thus obtained saponification product was washed thoroughly with methanol and thereafter dried under reduced pressure.

The copolymer obtained was insoluble in water but rapidly swellable in water. It can absorb 550 times as much as its own weight of water and was stable in excess water for a long term.

When the above saponified copolymer was converted into triethylamine salt, the product was found to be insoluble not only in water but also in methanol and water-alcohol mixture and have excellent absorption degree as shown in Table 2.

Table 2

| liquid to be absorbed | absorbency (g/g) |
|---|---|
| water | 320 |
| methanol | 75 |
| water-methanol mixture (20 % water) | 150 |
| water-isopropanol mixture (20 % water) | 45 |

What is claimed is:
1. A method for the preparation of a water insoluble, water absorbent polymer having a water absorbency of more than 10 times its own weight of water, comprising the steps of:
   (I) providing a crosslinked copolymer consisting of
      (1) a vinyl ester of a saturated carboxylic acid, (2) 5–95 mole % of acrylic acid, methacrylic acid, crotonic acid, itaconic acid, maleic acid, fumaric acid, maleic anhydride, itaconic anhydride, methyl acrylate, ethyl acrylate, n-propyl acrylate, iso-propyl acrylate, n-butyl acrylate, tert-butyl acrylate, methyl methacrylate, ethyl methacrylate, n-propyl methacrylate, iso-propyl methacrylate, n-butyl methacrylate, tert-butyl methacrylate, acrylamide or methacrylamide and (3) a crosslinking agent made by either (a) polymerising (1) and (2) in the presence of 0.005 to 20 mole % of (3) based on the total monomers, or (b) crosslinking a copolymer consisting essentially of (1) and (2) in the presence of 0.005 to 20 mole % of (3) based on the total monomer units in the copolymer, and (II) saponifying said crosslinked copolymer to obtain a saponified copolymer having a saponification degree of at least 50 mole % of (1), and at least 30 mole % of (2) in the crosslinked copolymer, respectively.

2. A method according to claim 1 wherein said copolymer contains 20 to 80 mole % of (2).

3. A method according to claim 1 wherein said copolymer contains 30 to 70 mole % of (2).

4. A method according to claim 1 wherein (1) is vinyl acetate, vinyl propionate or vinyl stearate.

5. A method according to claim 1 wherein the crosslinked copolymer is that obtained by crosslinking a copolymer of (1) and (2) in the presence of 0.005 to 20 mole % of crosslinking agent based on the total monomer units in the copolymer.

6. A method according to claim 1 wherein the amount of the crosslinking agent is in the range from 0.005 to 10 mole %.

7. A method according to claim 5 wherein the crosslinking agent is a polyallyl compound, a polyvinyl compound, allyl acrylate or allyl methacrylate.

8. A method according to claim 7 wherein the polyvinyl compound is divinyl benzene, ethyleneglycol diacrylate or glycerine trimethacrylate.

9. A method according to claim 1 wherein saponification is effected until at least 90 mole % of (1) is saponified.

10. A method according to claim 1 wherein saponification is effected until at least 70 mole % of (2) is saponified.

11. A method according to claim 1 wherein all or substantially all of component (2) in the saponified copolymer is an alkali salt of the carboxylic acid.

12. A method according to claim 11 wherein the alkali salt is an alkali metal salt or ammonium salt.

13. A method according to claim 12 wherein the salt is a sodium or potassium salt.

14. An absorbent polymer obtained by the method of claim 11.

15. A method according to claim 1 wherein the copolymer contains 30 to 70 mol % of (2), and saponification is effected until at least 90 mol % of (1) is saponified and all or substantially all of component (2) is converted into an alkali salt thereof.

16. An absorbent polymer obtained by the method of claim 15.

* * * * *